United States Patent Office 3,652,480
Patented Mar. 28, 1972

3,652,480
VINYL ESTER COPOLYMERIC EMULSIONS AND PAINTS PREPARED THEREFROM
James Newton Coker, Wilmington, Del., assignor to E. I. du Pont de Nemours and Company, Wilmington, Del.
No Drawing. Filed June 23, 1969, Ser. No. 835,798
Int. Cl. C09d 3/74, 5/04
U.S. Cl. 260—29.6 TA        19 Claims

ABSTRACT OF THE DISCLOSURE

A vinyl ester-based copolymer emulsion is provided which, because of internal modification, is suited for formulation into high-gloss and semigloss paints. The emulsion exhibits interaction with added pigment, thixotropy, body, pH and viscosity stability, as well as mechanical and freeze-thaw stability. The emulsion is readily coalescible under ambient conditions into clear, tough films which cure on drying and develop a high level of water resistance. The essential components of the emulsion are a copolymer of about 75 to 99 percent by weight of vinyl ester, 0 to about 24 percent by weight of softening monomer and about 1 to 3.5 percent by weight of the ammonium salt of an unsaturated carboxylic acid; 0.5 to 7 percent by weight surfactant, preferably 0.5 to 2.5 percent by weight of anionic surfactant and 1 to 4 percent by weight of nonionic surfactant; 0.3 to 3 percent by weight of alkylene imine added in a post-treatment step to iminate the copolymer; and sufficient ammonia banked as the carbonate-bicarbonate to maintain the pH between 7 and 8.4. The presence of about 0.01 to 1 percent by weight of one of a variety of colloidal carboxylated copolymer thickening agents in the emulsion, while not essential, enhances further the desired formulating rheology of the emulsion. Processes for preparing the emulsion and the derived paints are provided.

BACKGROUND OF THE INVENTION

Field of the invention

This invention relates to vinyl ester-based aqueous emulsions, processes for their preparation and paints derived therefrom.

Prior art

Polyvinyl acetate and vinyl acetate-based copolymers are well-known materials, and the literature abounds with methods for their preparation and suggestions for their use. Of special utility are aqueous emulsions which can be applied to various substrates (e.g., wood, paper, metal, glass) to produce protective coatings. When such emulsions are formulated with pigments and other additives, aqueous latex paints are produced. Various desirable emulsion properties needed to produce a superior latex paint include freeze-thaw stability, shelf stability, wet adhesion, scrub resistance and thixotropy, which are fully retained after the necessary formulating ingredients have been added. To date, no vinyl acetate-based emulsions have been devised which permit formulation of paints which have a high order of flow and leveling; pH, freeze-thaw, and mechanical stability; wet adhesion; scrub resistance; and a stable gloss which can be fixed at high, medium or low levels.

SUMMARY OF INVENTION

According to the present invention there is provided an aqueous emulsion comprising as essential components (1) a copolymer of about 75 to 99 percent by weight vinyl alkanoate, 0 to about 24 percent by weight of at least one softening monomer selected from the group consisting of an alpha-olefin and an alkyl ester of a carboxylic acid wherein the alkyl group contains 1 to 10 carbon atoms and the acid 3 to 6 carbon atoms and about 1 to 3.5 percent by weight of an ammonium salt of an unsaturated carboxylic acid, (2) about 0.3 to 3 percent by weight based on the weight of copolymer of alkylene imine used to iminate the copolymer, (3) ammonia in a sufficient amount to maintain the pH between about 7 and 8.4, and (4) about 0.5 to 7 percent by weight, based on the weight of copolymer, of a surfactant.

There is also provided a process for preparing an aqueous emulsion of a vinyl alkanoate-based copolymer comprising: (1) forming a solution of surfactant in water, the surfactant being present in an amount so that it constitutes about 0.5 to 7 percent by weight, based on the weight of resulting copolymer, (2) continuously adding to the surfactant solution with agitation (a) an emulsion polymerization initiator, (b) a comonomer mixture of vinyl alkanoate and at least one softening monomer selected from the group consisting of an alpha-olefin and an alkyl ester of a carboxylic acid wherein the alkyl group contains 1 to 10 carbon atoms and the acid 3 to 6 carbon atoms, the vinyl alkanoate being present in an amount so that it constitutes about 75 to 99 percent by weight of the resulting copolymer and the softening monomer present in an amount so that it constitutes 0 to about 24 percent by weight of the resulting copolymer, and (c) an unsaturated carboxylic acid neutralized with ammonia at least 50 percent by weight in an amount such that the ammonium salt of the acid constitutes about 1 to 3.5 percent by weight of the resulting copolymer, (3) copolymerizing with agitation the comonomer mixture and ammonium salt of an unsaturated carboxylic acid in the surfactant solution in the presence of the initiator, (4) continuing the copolymerization with agitation until the residual vinyl alkanoate monomer content is below about 0.8 percent by weight, (5) adding 0.05 to 0.30 percent by weight hydrazine at 50 to 70° C. to deactivate catalyst and monomer residue, (6) reacting the copolymer with from about 0.3 to 3 percent by weight based on the weight of the resulting copolymer of an alkylene imine, and (7) adding carbon dioxide to the emulsion to form ammonium carbonate or bicarbonate in an amount to adjust the pH in the range of about 7 to 8.4, thereby fully buffering the emulsion.

Finally, there is provided a process for preparing highly integrated pigment-binder latex mixtures containing finely divided pigment particles wetted and stabilized by latex particles comprising blending an aqueous dispersion of finely divided pigment and the binder emulsion using moderate stirring. The pigment is immediately dispersed and fully deflocculated by the sole action of the binder polymer emulsion yielding pigmented compositions which exhibit high scrub resistance, wet adhesion to alkyd-primed surfaces, gloss and high hiding power. Because the ammonium carboxylate functionality in the binder emulsion imparts both thickening, thixotropy and mechanical stability to the pigmented latex, the latter exhibits excellent paint-out rheology. Because of the presence of the ammonium carbonate-bicarbonate buffer in the emulsion, the pigmented latex shows excellent pH and viscosity stability. This composite of properties in the pigment-binder polymer latex renders it suitable as a precursor of a wide spectrum of semigloss and gloss paints which owe their paint-out properties primarily to the internal make-up of the binder polymer emulsion, and especially to the latter's ability to undergo strong interaction with the pigment.

DETAILED DESCRIPTION OF INVENTION

Fine particle-size (0.08 to 0.25μ) polymer emulsions are produced which are based on vinyl alkanoates such as vinyl acetate and contain a random distribution of carboxyl groups. These products are unique in that when they are blended with finely divided (0.25μ) aqueous suspensions of rutile titania, they yield compositions in which the pigment is highly deflocculated and also internally wetted by the polymer particles. Maximum interaction is achieved above a pH of 6.5. The pigmented emulsions are precursors of aqueous high-gloss and semigloss paints, provided appropriate conditions are employed in the preparation of the binder emulsion precursors. These conditions are: (1) using an unsaturated acid comonomer such as acrylic acid, itaconic acid or methyl hydrogen maleate which is copolymerized randomly with vinyl acetate; (2) fixing the acid comonomer concentration at about 1 to 3.5 percent by weight with a preferred range of 1.5 to 2.5 percent by weight; (3) continuously charging to the polymerization the acid comonomer neutralized at least 50 percent with a fugitive base such as ammonia; (4) incorporating 0 to 24 percent by weight with a preferred range of 5 to 15 percent by weight of softening comonomer (e.g., n-butyl acrylate) in the binder polymer; (5) carrying out the polymerization in the presence of 0 to 1 percent by weight (preferred range 0.01 to 0.10 percent by weight) of a carboxylated protective colloid copolymer (e.g., carboxylated polyacrylamide or styrene/maleic acid copolymer); (6) iminating the copolymer with about 0.3 to 3 percent by weight of an alkylene imine (i.e., ethylenimine) to impart wet adhesion to the resulting coating; and finally, (7) buffering the iminated product with a mixture of ammonium carbonate-bicarbonate to a pH of approximately 7 to 8.4 (preferred range: 7.2 to 8) to achieve both pH and viscosity stability. The paints derived from these emulsions are unique in that they utilize (1) an internally contained mechanism for pigment deflocculating and wetting of the pigment by the binder polymer, and (2) an internally contained thickening mechanism which imparts a highly desirable thixotropy to the paints. Moreover, they contain functionality, namely, carboxyl, amino and acetate groups, capable of yielding cured structures in the dried paint films.

The binder polymer emulsion of the present invention comprises four essential components which make it suited for producing semigloss and gloss paints which exhibit stable paint-out rheology and wet properties. The first of these is the presence of about 1 to 3.5, preferably 1.5 to 2.5, percent by weight of randomly distributed ammonium carboxylate groups which are incorporated in the binder copolymer by charging the carboxyl-containing monomer as the partial ammonium salt rather than as free acid. This condition yields a binder polymer emulsion which exhibits a maximum degree of interaction with pigment; it also imparts paint-out rheology to derived formulations such as thixotropy, body, flow and leveling, anti-sag behavior, and brushability. Surprisingly, the highly integrated pigment-binder emulsion combinations yield dried films which exhibit outstanding scrub resistance (i.e., 1200–1800 scrubs as measured by proposed ASTM Method, Committee D-1, Subcommittee 42).

These features relating to performance of the formulated paints stand in sharp contrast to that shown by paints prepared with binder emulsions produced by charging the carboxyl-containing monomer as the free acid. The latter formulations undergo drastic thickening and thinning with pH, thereby exhibiting unpredictable and nonreproducible rheology. Further contrast is provided by an examination of paints formulated with vinyl acetate-based emulsions containing less than 1.0 percent by weight carboxylated comonomer. These formulations show greatly reduced tendency to deflocculate and become integrated with rutile titania, as evidenced by the low-gloss and grainy appearance of dried films of the pigmented emulsions. These formulations are nonthixotropic and exhibit very inferior paint-out rheology.

The ammonium salts of unsaturated carboxylic acids are the ammonium salts of acrylic acid, methacrylic acid, itaconic acid and its half esters with alkanols, maleic acid and its half esters with alkanols, fumaric acid and crotonic acid. The most preferred carboxylated monomers are ammonium acrylate, ammonium itaconate and ammonium methyl maleate.

The second essential component of the emulsion is an alkylene imine which is reacted with the preformed carboxylated binder copolymer according to the method disclosed in U.S. Pat. 3,309,331 issued to Maurice J. McDowell and Trevor B. Hill on Mar. 14, 1967. This treatment imparts wet adhesion of the applied coating to alkyd-primed surfaces as measured by soaking these coated surfaces, after appropriate drying, in water. Best results are obtained using approximately 0.3 to 3 percent by weight of alkylene imine based on the weght of copolymer in the emulsion. This wet adhesion stands in dramatic contrast to that shown by paints formulated with either the uniminated binder polymer emulsion described above or with typical vinyl acetate-based binder emulsions; these latter materials show little or no wet adhesion to typical alkyd-painted surfaces.

The third component of the emulsion is a reservoir of ammonia (or its volatile amine equivalent such as triethylamine) in an amount sufficient to maintain the pH between 7 and 8.4, preferably 7.2 and 8. This reservoir is obtained by "banking" ammonia in the emulsion as ammonium carbonate, ammonium carbamate, ammonium bicarbonate, or mixtures of these materials, depending on the formulating pH desired within the above-specified range. The most convenient method for getting adequate cencentrations of these buffers is to introduce gaseous carbon dioxide at the completion of the imination reaction so as to reduce the pH from about 8.3 to 9.2 to the level desired. Alternatively, ammonium carbonate, carbamate, or bicarbonate, or a mixture of these materials can be added directly. These salts, like ammonia, are entirely fugitive and their presence has little effect on wet properties because they volatilize rapidly out of the drying paint films.

The fourth component is a surfactant system. Surfactant systems capable of producing small particle-size (0.1μ) emulsions having excellent mechanical stability are preferred in preparing the binder polymer emulsion.

The surfactants are generally used at a concentration of 0.5 to 7 percent by weight, depending upon surfactant used, preferably about 3.5 to 5 percent by weight. These surfactants may be anionic, cationic or nonionic; however, anionic and nonionic compounds and mixtures thereof are preferred. Examples of anionic surfactants that can be used are the higher fatty alcohol sulfates such as sodium lauryl sulfate, the alkylaryl sulfonates such as sodium t-octylphenyl sulfonate, the sodium dioctylsulfosuccinates and the sodium dihexylsulfosuccinates and various alkyl phosphate salts. Suitable nonionic surfactants are the alkylphenoxypolyethoxyethanols having alkyl groups of 7 to 18 carbon atoms and 6 to 60 or more oxyethylene units such as octylphenoxypolyethoxyethanols; the polyethoxyethanol derivatives of long-chain fatty alcohols such as lauryl, myristyl, stearyl, or oleoyl; the polyethoxyethanol derivatives of methylene linked alkyl phenols; the ethylene oxide derivatives of long-chain carboxylic acids such as lauric, myristic, oleic, or mixture of such acids as found in tall oil, containing 6 to 60 oxyethylene units per molecule; block copolymers of ethylene oxide and propylene oxide comprising a hydrophobic propylene oxide section combined with one or more hydrophilic ethylene oxide sections. Best results have been obtained using a combination anionic and nonionic surfactant such as:

(1) "Triton" QS–9 [1] (ammonium salt) (2%)+"Triton" X–405 [2] (3%).
(2) "Santomerse" S [3] (2%)+"Triton" X–405 [2] (3%).
(3) "Ultrawet" K [3] (2%)+"Triton" X–405 [2] (3%).

The indicated percentages specify optimum concentrations of the emulsifiers based on the weight of copolymer contained in the emulsion. The preferred surfactant system is the "Triton" QS–9 "Triton" X–405 combination because it promotes the formation of small, uniform particle-size ($0.1\mu$) emulsions; has a low initiator demand (e.g., permits the use of only 0.15 to 0.25 weight percent based on the copolymer); exercises little or no inhibition on the initiation of the polymerization; and contributes to the good wet properties of the coating formed from the emulsion product.

A number of features have been incorporated in the binder polymer emulsion for the purpose of improving its performance in derived paint formulations. These include; (1) the inclusion of a softening comonomer to improve the low-temperature coalescence of the derived paints; (2) the use of a colloidal carboxylated copolymer as a bodying agent either pre-added as a protective colloid to the polymerization charge and/or post-added to the emulsion; and (3) the incorporation of ingredients containing only fugitive cations, preferably ammonium, in the make-up of the binder polymer to facilities the curability and to enhance the water resistance of the derived paint films.

Softening monomers suitable for providing adequate low-temperature coalescence are alpha-olefins such as ethylene as well as alkyl esters of an unsaturated acid wherein the alkyl group contains 1 to 10 carbon atoms and the acid 3 to 6 carbon atoms. Such esters would include n-butyl acrylate, 2-ethylhexyl acrylate, di-n-butyl maleate, sec-butyl acrylate, n-hexyl acrylate and di-n-butyl fumarate. These latter softening monomers are present in the copolymer at between 0 to 24 percent by weight, preferably 5 to 15 percent by weight, with a most preferred concentration of about 10 percent by weight. With ethylene, best performance is realized if 6 to 12 percent by weight with a preferred range of 8 to 10 percent by weight of this material is present in the copolymer. The preferred softening monomer is n-butyl acrylate due to the greater simplicity of incorporation under non-pressure conditions. The vinyl alkanoate incorporated as the principal component of the binder polymer at a level of 75 to 99 percent by weight, preferably about 82 to 94 percent by weight, can have 1 to 8 carbon atoms in the alkyl group, but vinyl acetate is preferred. Other vinyl monomers are vinyl propionate, vinyl versatate, vinyl isobutyrate, vinyl caproate and vinyl caprylate.

The colloidal (i.e. about $10^{-7}$ to $10^{-5}\mu$ in particle size) copolymers found to be most useful for enhancing the body and thixotropic characteristics of the binder emulsion and also of the derived paints are of the carboxylated type and are employed at a level within the range of 0.01 to 1 percent by weight, based on the weight of copolymer, preferably 0.01 to 0.10 percent by weight. For example, excellent results can be obtained with a carboxylated polyacrylamide such as "Polyhall" 295. Various carboxylated copolymers can also be used. These include the ammonium salt of copolymers of styrene, ethylene, vinyl acetate or methyl vinyl ether with maleic, fumaric, acrylic, methacrylic or itaconic acid as well as various polyacrylamides and polymethacrylamides. The "Polyhall" 295 thickener is more efficient in its thickening action than the other thickeners mentioned since it is operable at one-sixth to one-half the concentration of the latter materials. All of the thickening agents listed can be added to the polymerization charge either as a dry powder or as a 1.0 percent by weight aqueous ammoniacal solution. The solution form of the thickener is the form used for post-addition to the emulsion or to the derived paints.

Other thickeners are also useful. These include methyl cellulose, hydroxyethyl cellulose, ammonium polyacrylate, ammonium polymethacrylate as well as thickeners referred to as Thickener L and Thickener LN, which can be obtained from General Aniline and Film Corp. The latter products are believed to be esters of two parts of a methyl vinyl ether/maleic anhydride 1/1 copolymer and 1 part of a polyoxyethylated lauryl alcohol having 16 moles of ethylene oxide units per mole of units. Thickener L is a potassium salt and Thickener LN is an ammonium salt.

The preferred binder polymer, namely, an 88/10/2 vinyl acetate/n-butyl acrylate/ammonium acrylate terpolymer, thickened and iminated, exhibits the feature of undergoing spontaneous curing upon aging as a coalesced film. The net effect of this behavior is to yield coating compositions which exhibit increased toughness (longer elongation at break) and water resistance after several weeks of aging. This curing reaction is particularly important in rendering the polymer suitable as a water-based paint binder. For example, the water resistance of the derived paints is roughly equivalent to that observed with the now commercially available acrylic paints and is superior to that exhibited by paints prepared with currently available vinyl acetate-based binder emulsions.

The procedure used for preparing the emulsions of the present invention involves the use of an emulsion polymerization initiator, preferably an active redox initiator system employing a reducing component such as t-butyl hydroperoxide-sulfoxylate (preferred concentration of each component: 0.15 to 0.25 percent based on copolymer weight) augmented with a small amount of a water-soluble initiator such as ammonium persulfate (preferred concentration: 0.05 to 0.10 percent by weight based on copolymer weight); a reaction temperature of 35 to 90° C., preferably, of 60 to 70° C.; a mode of operation which involves the continuous and separate addition in the desired proportions of the vinyl and softening monomers, the ammonium salt of the acid and the initiator (for the redox system, the two components are added separately) to an aqueous solution of the surfactant and thickening colloid, if used, components over a fixed reaction cycle of 1 to 2 hours duration. This is followed by post-treatment with the initiator components to reduce the residual vinyl content of the product to less than about 0.8 percent, preferably less than 0.5 percent based on copolymer weight; addition of 0.05 to 0.30 weight percent hydrazine at 50 to 70° C. to deactivate the catalyst and monomer residue; treatment of the emulsion product at 35 to 90° C., preferably 60 to 70° C., with an aqueous solution of 0.3 to 3 percent by weight of ethylenimine based on the weight of copolymers; and finally, neutralization of the emulsion with gaseous $CO_2$ to a pH of 7.0 to 8.4. The concentration of reactants employed and water are such as to yield a product which contains 45 to 60 weight percent solids after imination with a preferred solids range of 50 to 55 percent by weight. The product is obtained as a fluid, bluish opulescent emulsion with an average particle size of $0.1\mu$ and with a relatively narrow particle size distribution (i.e., 0.25 to $0.3\mu$ range).

Formulation of paints using the above-described emulsion involves the addition to it of a finely divided aqueous dispersion grind of a pigment such as rutile titania (e.g., "Ti-Pure" R–900 or R–960) with efficient stirring at a rate so that a relatively constant viscosity is maintained in the mixture. Under these conditions the pigment is deflocculated upon contact with the latex, dispersed and then absorbed into the latex due to an affinity for the ammonium carboxylate groups contained in the latex. Reversal of this order of addition, namely, addition of ---
[1] "Triton" QS—9: a polyethylene oxide phosphate anionic type used as the sodium or ammonium salt.
[2] "Triton" X–405: a polyethylene oxide nonionic type.
[3] A fatty alkyl sulfate, sodium salt-anionic.

the emulsion to the grind, can be used; however, unless separately added pigment deflocculating agents are present in the grind intermediate clumping of the pigment particles is sometimes experienced. The pigment grind normally consists of pigment, water, humectant (e.g., propylene glycol), preservative, and defoaming agent. The incorporation of a small amount of one or more pigment deflocculating agents (potassium tripolyphosphate, "Tamol" 731) in the grind must be carried out carefully because of possible deleterious effects on the gloss and wet properties of the derived paint films. This effect is attributed to the ability of these materials to diminish the strong interaction between the binder polymer and pigment. Finally, the pH of the formulated paint is adjusted to a pH of 7.2 to 8.2 by the addition of ammonia and/or ammonium bicarbonate. The resulting formulation after 12 to 18 hours aging under ambient conditions develops body and thixotropy and is ready for application.

The binder polymer emulsion, when used to formulate paints, can have a high pigment-loading capacity. The weight of pigment loaded in the emulsion can be between 15 and 60 percent pigment volume concentration (PVC), which is the percentage of total volume of the solids (pigment plus binder) in the paint composition. The preferred PVC range is 25 to 30 percent. In this range excellent hiding power along with gloss values over a broad gloss range (measured at 60°) of 15 to 80, without deterioration in value, can be realized. Well-known conventional pigments such as rutile titanium dioxide, anatase titanium dioxide, carbon black, lamp black, chromium oxide, zinc oxide, cadmium sulfide, chrome yellow, chrome green, lithopone, black iron oxide and "Monastrol" blue pigment, as well as a variety of extender pigments such as various clays, talc, diatomaceous earth, mica, calcium carbonate, and silica can be used in the pigment grind. Best results are obtained using either rutile titanium dioxide alone or extended with various clays (e.g., ASP-400). The pigments and other typical formulating ingredients are preferably ground on a three-roll mill or on a colloid mill to form a pigment grind in water, which is then added to the emulsion.

The derived paints exhibit excellent shelf stability as reflected by excellent mechanical, freeze-thaw, pH and viscosity stability.

The emulsion of the present invention possesses properties required to prepare an acceptable semigloss or high-gloss aqueous-based paint. For instance, the ammonium carboxylate groups on the binder polymer permit a high level of interaction of the binder emulsion with the pigment, impart body and thixotropic character which is fully controllable and reproducible, and also mechanical and freeze-thaw stability. The iminated carboxyl groups are necessary for wet adhesion to alkyd substrates while the fugitive base and buffer system is needed to facilitate the curing of binder polymer films as well as to impart pH and viscosity stability to the derived paints.

The invention can be further understood by the following examples in which parts and percentages are by weight unless otherwise indicated.

EXAMPLE 1

(A) Preparation of the binder dispersion

The following materials were used in the preparation of the emulsion:

Monomers:
2112 g. vinyl acetate (2–4 p.p.m. hydroquinone)
240 g. n-butyl acrylate (5 p.p.m. methyl ether hydoquinone)
480 g. 10% acrylic acid (200 p.p.m. methyl ether hydroquinone) (partially neutralized to pH 5.5 with $NH_3$)

Surfactant:
103 g. "Triton" X–405 (70%)[1] (3% nonionic)
71 g. "Triton" QS–9 (70%)[2] (2% anionic)
980 ml. $H_2O$ (neutralized to pH 5.5 with $NH_3$)
Colloidal thickener:
40 g. 1% aqueous "Polyhall" 295
Initiator-Activator:
250 g. 2% aqueous t-butyl hydroperoxide (90%)
250 g. 2% aqueous sodium formaldehyde sulfoxylate To a 12-liter flask equipped with a mechanical stirrer, a thermometer, a reflux condenser and four addition funnels was added the surfactant solution of "Triton" X–405 and "Triton" QS–9 along with the 1% aqueous "Polyhall" 295 solution. After the reaction mixture had been brought to 60° C., 120 ml. of the vinyl acetate/n-butyl acrylate mixture was added along with 10 ml. of the 2% t-butyl hydroperoxide solution and 10 ml. of the 2% sodium formaldehyde sulfoxylate solution. After the temperature of the water bath had been adjusted so as to maintain the reaction temperature at 70±1° C., simultaneous addition was begun of the vinyl acetate/n-butyl acrylate mixture, the ammonium acrylate solution, the 2% t-butyl hydroperoxide solution and the 2% sodium formaldehyde sulfoxylate solution; the comonomer components were added over a period of 2 hours and the initiator and activator components over a 4-hour period. Finally, the charge was held for an additional hour. A reaction temperature of 70±1° C. together with a moderate rate of agitation was maintained throughout the charging and hold cycles. The product after cooling to 60° C. was ready for imination, or it could be cooled to ambient temperature for discharge. The reaction yielded 4400 g. fluid, bluish dispersed product which contained 54% solids and exhibited a pH of 5.7. The contained copolymer was composed of 88% vinyl acetate, 10% n-butyl acrylate and 2% acrylic acid as its partial ammonium salt and exhibited an inherent viscosity of about 0.8.

(B) Imination of the binder dispersion

Operating in the same 12-liter reaction flask, the dispersion was brought to a temperature of 59–61° C. with vigorous stirring. A mixture of 6.2 g. 85% hydrazine in 175 ml. water was added over a period of one-half hour, followed by one-half hour holding. A cold mixture of 40 ml. ethylenimine in 175 ml. water was added over a period of one-half hour, followed by one-half hour holding. The charge was then cooled to 30–35° C. and saturated with gaseous carbon dioxide until a pH of about 7 was reached. The fluid, bluish product was finally discharged in a yield of 4800 g. It contained 50% solids, exhibited excellent freeze-thaw (i.e., greater than 3 cycles) and mechanical stability (i.e., survived 10 minutes in a Waring Blendor without undergoing an appreciable change in viscosity) and showed little or no tendency to undergo reversible thickening and thinning with pH.

(C) Formulation of a typical paint (1) Preparation of the pigment grind.—To a mixture of 2230 g. water, 720 g. propylene glycol, 19 g. Colloid's Defoamer 581B, and 5 g. phenyl mercury acetate ("Nuodex" PMA–18) was added with stirring 3080 g. "Ti-Pure" R–900 rutile titania. After 10 to 15 minutes of moderate agitation, a thick fluid suspension was obtained. The latter was passed three times through a Morehouse stone mill, yielding a very finely divided (0.25μ) pigment dispersion. This dispersion was used without further modification in the reduction step described below.

(2) Preparation of a latex paint having a PVC of 31.—To 3700 g. iminated binder emulsion as prepared in B, containing 50% solids and exhibiting a pH of 7 to 7.2, was added 6000 g. pigment grind over a period of 5 minutes with very thorough mixing. When this addition was ---
[1] Nonionic—a polyethylene oxide.
[2] Anionic—an $NH_4$ salt of polyethyleneoxide phosphate.

complete, the pH of the mixture had risen to about 7.3 to 7.5, after which the pH was adjusted to 7.6 to 7.7 with ammonia. The resulting paint was stored 18 hours before evaluation. After this aging period, it exhibited excellent flow and leveling and had good body (75 to 85 Krebs) and hiding power (SX=10). The paint films derived from this paint after 18 to 24 hours' drying exhibited 60° gloss values amounting to 60–70% reflectance. These paint films also exhibited excellent wet properties, namely:

(a) Scrub resistance in excess of 1000 scrubs as measured by ASTM Proposed Method, Committee D-1, Subcommittee 42).

(b) Wet adhesion to alkyd-primed surfaces roughly comparable to that shown by the excellent acrylic controls.

(c) Little or no water spotting.

Paint film properties as above recited were determined by the following tests:

(1) Flow and leveling of a given formulation was determined by paint-out, followed by visual examination of the dried paint film for brush marks according to the New York Paint and Varnish Production Club Test Method.

(2) Body was measured with a Stormer Viscosimeter according to ASTM-D 562–55.

(3) Gloss was measured using a standard Gardner 60° incidence gloss meter.

(4) Hiding power of the dried paint film was determined using the standard optical density method.

(5) Wet adhesion was determined by exposing the paint film after a minimum of 4 days drying a puddle of water for 10 minutes. The water was removed and the resistance of the exposed area to scraping with a sharp edge (e.g., fingernail) was tested. Similar results were obtained after 1 hour exposure to water.

(6) Water spotting was tested by observing any shiny or discolored streak which forms after the dried paint film was exposed to a stream or puddle of water and then re-dried.

EXAMPLES 2–19

Following the procedure of Example 1, the dispersions shown in Table I were prepared. Each of the dispersions, prior to imination, had the following general characteristics: a pH of about 5.6 to 5.8, a percent solids content of about 54–56%, a percent residual vinyl acetate monomer content of 0.2–0.8% by weight, a Brookfield viscosity of about 300–600 cp. and a blue opalescent color. After imination, all general characteristics were the same except the pH was about 7.9 to 8.4. The final products, after carbon dioxide neutralization, each had a pH of about 7, a solids content of about 50–55% and a Brookfield viscosity of about 100 to 400 cps.

These emulsions when formulated into latex paints, gave dried paint films with good over-all properties. The paint films varied in their specific properties and exhibited, in some instances, slight losses from optimum values in some particular properties, depending upon the emulsion formulation used.

TABLE I

| Example No. | Softening monomer | Wt. percent softening monomer | Acid monomer NH₄ salt | Wt. percent acid monomer | Surfactant | Weight percent Surfactant | Imination |
|---|---|---|---|---|---|---|---|
| 2 | | | Acrylic | 2 | Triton QS-9 | 2 | |
| | | | | | Triton X-405 | 2 | 1.2 |
| 3 | n-Butyl acrylate | 5 | do | 2 | Triton QS-9 | 2 | |
| | | | | | Triton X-405 | 2 | 1.2 |
| 4 | do | 10 | do | 2 | Triton QS-9 | 2 | |
| | | | | | Triton X-405 | 3 | 1.2 |
| 5 | do | 15 | do | 2 | Triton QS-9 | 2 | |
| | | | | | Triton X-405 | 3 | 1.2 |
| Control | do | 10 | do | 0.5 | Triton QS-9 | 2 | |
| | | | | | Triton X-405 | 3 | 1.2 |
| 6 | do | 10 | do | 1 | Triton QS-9 | 2 | |
| | | | | | Triton X-405 | 3 | 1.2 |
| 7 | do | 10 | do | 3.5 | Triton QS-9 | 2 | |
| | | | | | Triton X-405 | 3 | 1.2 |
| 8 | Di-n-butyl maleate | 10 | do | 2 | Santomerse S [1] | 1 | |
| | | | | | Cellosize WP-300 [2] | 1 | 1.2 |
| 9 | 2-ethylhexyl acrylate | 10 | do | 2 | Santomerse S [1] | 1 | |
| | | | | | Cellosize WP-300 [2] | 1 | 1.2 |
| 10 | Ethylene | 8 | do | 2 | Triton QS-9 | 2 | |
| | | | | | Triton X-405 | 3 | 1.2 |
| 11 | do | 9.6 | do | 2 | Triton QS-9 | 2 | |
| | | | | | Triton X-405 | 3 | 1.2 |
| 12 | n-Butyl acrylate | 10 | do | 2 | Triton QS-9 | 2 | |
| | | | | | Triton X-405 | 3 | 1. |
| 13 | do | 10 | do | 2 | Triton QS-9 | 2 | |
| | | | | | Triton X-405 | 3 | 0.4 |
| 14 | do | 10 | do | 2 | Duponol WAQE [3] | 2 | 1.2 |
| 15 | do | 10 | do | 2 | Santomerse S | 2 | |
| | | | | | Cellosize WP-300 | 3 | 1.2 |
| 16 | do | | 10 Itaconic | 1.8 | Santomerse S | 1 | |
| | | | | | Triton X-305 | 2.5 | |
| | | | | | Pluronic P-104 | 2.5 | 1.2 |
| 17 | do | | 10 Methyl hydrogen maleate | 3.5 | Santomerse S | 1 | |
| | | | | | Triton X-305 | 2.5 | |
| | | | | | Pluronic P-104 | 2.5 | 1.2 |
| 18 | do | | 10 Methacrylic | 2.5 | Triton QS-9 | 2 | |
| | | | | | Triton X-405 | 3 | 1.2 |
| 19 | do | | 10 Acrylic | 2 | Triton QS-9 | 2 | |
| | | | | | Triton X-405 | 3 | |
| | | | | | Thickener LN | 0.1 | 1.2 |

[1] Anionic, a fatty alkyl sulfate sodium salt.
[2] Thickener, hydroxyethyl cellulose.
[3] Anionic, sodium lauryl sulfate.

What is claimed is:

1. An aqueous emulsion comprising as essential components (1) a copolymer of about 75 to 99 percent by weight vinyl alkanoate having 1 to 8 carbon atoms in the alkyl group, 0 to about 24 percent by weight of at least one softening monomer selected from the group consisting of an alpha-olefin and an alkyl ester of a carboxylic acid wherein the alkyl group contains 1 to 10 carbon atoms and the acid 3 to 6 carbon atoms and about 1 to 3.5 percent by weight of an unsaturated mono- or di-carboxylic acid which is neutralized at least 50 percent with ammonia during polymerization, (2) about 0.3 to 3 percent by weight, based on the weight of copolymer, of alkylene imine selected from the group consisting of ethylenimine and propylenimine used to iminate the copolymer, (3) ammonia in a sufficient amount to maintain the pH between about 7 and 8.3, the ammonia in the form of its carbonate salt, carbamate salt, bicarbonate salt or mixtures thereof, and (4) about 0.5 to 7 percent by weight, based on the weight of the copolymer, of a surfactant selected from the group consisting of an anionic surfactant, nonionic surfactant and a mixture thereof.

2. The emulsion of claim 1 wherein the vinyl alkanoate is vinyl acetate.

3. The emulsion of claim 2 wherein the softening monomer is an alkyl ester of acrylic acid or methacrylic acid wherein the alkyl group is from 1 to 10 carbon atoms.

4. The emulsion of claim 2 wherein the ammonium salt of a carboxylic acid is the ammonium salt of acrylic acid.

5. The emulsion of claim 2 wherein the ammonia is present in the form of its carbonate salt, bicarbonate salt or mixtures thereof.

6. The emulsion of claim 2 wherein the surfactant is a mixture of about 0.5 to 2.5 percent by weight of an anionic surfactant and about 1 to 4 percent by weight of a nonionic surfactant.

7. The emulsion of claim 6 wherein the anionic surfactant is a polyethylene oxide phosphate (ammonium salt) and the nonionic surfactant is a polyethylene oxide.

8. The emulsion of claim 2 containing a pigment.

9. The emulsion of claim 8 wherein the pigment is rutile titania and is present at a pigment volume concentration within the range of 15 to 60.

10. An aqueous emulsion comprising as essential components (1) a copolymer of about 82 to 94 percent by weight vinyl acetate, about 5 to 15 percent by weight of at least one softening monomer selected from the group consisting of an alpha-olefin and an alkyl ester of a carboxylic acid wherein the alkyl group contains 1 to 10 carbon atoms and the acid 3 to 6 carbon atoms and about 1.5 to 2.5 percent by weight of an unsaturated mono- or di-carboxylic acid which is neutralized at least 50 percent with ammonia during polymerization, (2) about 0.3 to 3 percent by weight of ethylenimine or propylenimine used to iminate the copolymer, (3) ammonia present in the form of its carbonate salt, bicarbonate salt or mixtures thereof sufficient to maintain the pH between 7.2 and 8, and (4) 3.5 to 5 percent by weight, based on the weight of copolymer, of a mixture of an anionic surfactant and a nonionic surfactant.

11. The emulsion of claim 10 wherein the ammonium salt of a carboxylic acid is the ammonium salt of acrylic acid.

12. The emulsion of claim 10 containing a pigment.

13. An aqueous emulsion comprising as essential components (1) a copolymer of about 82 to 94 percent by weight vinyl acetate, about 15 to 5 percent by weight n-butyl acrylate and about 2.5 to 1.5 percent by weight of the ammonium salt of acrylic acid randomly distributed along the polymer chain, (2) 0.3 to 3 percent by weight, based on the weight of copolymer, of ethylenimine used to iminate the copolymer, (3) a mixture of ammonium carbonate and ammonium bicarbonate in an amount sufficient to maintain the pH between about 7.2 and 8, and (4) about 3.5 and 5 percent by weight, based on the weight of copolymer, of a polyethylene oxide phosphate (ammonium salt) as anionic surfactant and a polyethylene oxide as nonionic surfactant.

14. The emulsion of claim 13 containing a pigment.

15. The emulsion of claim 14 wherein the pigment is rutile titania and is present at a pigment volume concentration within the range of 15 to 60.

16. A process for preparing an aqueous emulsion of a vinyl alkanoate-based copolymer comprising: (1) forming a solution of surfactant in water, the surfactant being present in an amount so that it constitutes about 0.5 to 7 percent by weight, based on the weight of resulting copolymer, said surfacant being an anionic surfactant, nonionic surfactant or mixture thereof, (2) continuously adding to the surfactant solution with agitation (a) an emulsion polymerization initiator, (b) a comonomer mixture of vinyl alkanoate and at least one softening monomer selected from the group consisting of an alpha-olefin and an alkyl ester of a carboxylic acid wherein the alkyl group contains 1 to 10 carbon atoms and the acid 3 to 6 carbon atoms, the vinyl alkanoate being present in an amount so that it constitutes about 75 to 99 percent by weight of the resulting copolymer and the softening monomer present in an amount so that it constitutes 0 to about 24 percent by weight of the resulting copolymer, and (c) an unsaturated mono- or di-carboxylic acid neutralized with ammonia at least 50 percent by weight in an amount such that the ammonium salt of the acid constitutes about 1 to 3.5 percent by weight of the resulting copolymer, (3) copolymerizing with agitation the comonomer mixture and ammonium salt of an unsaturated carboxylic acid in the surfactant solution in the presence of the initiator, (4) continuing the copolymerization with agitation until the residual vinyl alkanoate monomer content is below about 0.8 percent by weight, (5) treating the emulsion product with 0.5 to 0.30 percent by weight of hydrazine to remove color-forming residues, (6) reacting the copolymer with from about 0.3 to 3 percent by weight, based on the weight of the resulting copolymer, of an alkylene imine selected from the group consisting of ethylenimine and propylenimine, and (7) adding carbon dioxide to the emulsion to form ammonium carbonate or bicarbonate in an amount to adjust the pH in the range of about 7 to 8.4, thereby fully buffering the emulsion.

17. The process of claim 16 wherein (1) the vinyl alkanoate is vinyl acetate, (2) the ammonium salt of an unsaturated carboxylic acid is the ammonium salt of acrylic acid, and (3) the emulsion polymerization initiator is a redox system initiator in which the oxidizing component and activating component are fed to the surfactant solution in separate feeds.

18. The process of claim 17 wherein the polymerization and imination reactions are carried out at a temperature within the range of 35 to 90° C.

19. The process of claim 17 wherein an aqueous pigment grind is added to the resulting emulsion.

References Cited

UNITED STATES PATENTS

| | | | |
|---|---|---|---|
| 3,002,940 | 10/1961 | Holloway | 260—29.6 TA |
| 3,282,879 | 11/1966 | Werner | 260—29.6 TA |
| 3,309,331 | 3/1967 | McDowell et al. | 260—29.6 TA |
| 3,350,339 | 10/1967 | Sekmakas | 260—29.6 TA |
| 3,530,080 | 9/1970 | Inskip | 260—8 |

WILLIAM H. SHORT, Primary Examiner

L. M. PHYNES, Assistant Examiner

U.S. Cl. X.R.

260—29.6 RW, 29.6 WB, 41 B